(12) United States Patent
Pasupuleti et al.

(10) Patent No.: US 12,526,423 B2
(45) Date of Patent: Jan. 13, 2026

(54) METHODS AND APPARATUS FOR PROCESSING OF HIGH-RESOLUTION VIDEO CONTENT

(71) Applicant: SAMSUNG ELECTRONICS CO., LTD., Suwon-si (KR)

(72) Inventors: Sirish Kumar Pasupuleti, Bengaluru (IN); Raj Narayana Gadde, Bengaluru (IN); Sarvesh, Bengaluru (IN); Kinsuk Das, Bengaluru (IN); Ankit Singh, Bengaluru (IN); Sai Harish Avula, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 788 days.

(21) Appl. No.: 17/868,421

(22) Filed: Jul. 19, 2022

(65) Prior Publication Data
US 2022/0385914 A1 Dec. 1, 2022

Related U.S. Application Data

(63) Continuation of application No. PCT/KR2022/007288, filed on May 23, 2022.

(30) Foreign Application Priority Data

May 27, 2021 (IN) .............................. 202141023707
Feb. 3, 2022 (IN) ............................... 20214023707

(51) Int. Cl.
*H04N 19/132* (2014.01)
*H04N 19/172* (2014.01)
(Continued)

(52) U.S. Cl.
CPC ......... *H04N 19/132* (2014.11); *H04N 19/172* (2014.11); *H04N 19/30* (2014.11); *H04N 19/86* (2014.11)

(58) Field of Classification Search
USPC ..................................................... 375/240.02
See application file for complete search history.

(56) References Cited

U.S. PATENT DOCUMENTS 10,382,770 B2    8/2019    Wang et al.
10,681,361 B2    6/2020    Wang et al.
(Continued)

FOREIGN PATENT DOCUMENTS

CN    108650510 A    10/2018
CN    110178373 A    8/2019
(Continued)

OTHER PUBLICATIONS inFERENCe, "2016 Holiday Special: Deriving the Subpixel CNN from First Principles," Dec. 23, 2016, Total 10 pages, retrieved from https://www.inference.vc/holiday-special-deriving-the-subpixel-cnn-from-first-principles/.
(Continued)

*Primary Examiner* — Stuart D Bennett
(74) *Attorney, Agent, or Firm* — Sughrue Mion, PLLC

(57) ABSTRACT

The present disclosure refers to methods and apparatuses for processing of high-resolution video content. In an embodiment, a method includes generating a first group of video frames from the video content. The first group of video frames has a first resolution lower than a resolution of the video content and a first rate-distortion score. The method further includes generating a second group of video frames from the video content. The second group of video frames has a second resolution lower than the resolution of the video content and a second rate-distortion score. The method further includes selecting an optimal group of video frames from the first and second groups of video frames based on a comparison between the first and second rate-distortion scores. The optimal group of video frames has a rate-
(Continued)

distortion score lower than the first and the second rate-distortion scores.

16 Claims, 13 Drawing Sheets

(51) Int. Cl.
*H04N 19/30* (2014.01)
*H04N 19/86* (2014.01)

(56) References Cited

U.S. PATENT DOCUMENTS

| | | | |
|---|---|---|---|
| 10,812,813 | B2 | 10/2020 | Wang et al. |
| 11,190,784 | B2 | 11/2021 | Kim et al. |
| 11,468,318 | B2 | 10/2022 | Liu et al. |
| 2015/0256755 | A1 | 9/2015 | Wu et al. |
| 2018/0227585 | A1 | 8/2018 | Wang et al. |
| 2019/0200015 | A1* | 6/2019 | Hori .................... H04N 19/593 |
| 2019/0313124 | A1* | 10/2019 | Stepin .................. H04N 19/117 |
| 2019/0342561 | A1 | 11/2019 | Wang et al. |
| 2020/0012940 | A1 | 1/2020 | Liu et al. |
| 2020/0234469 | A1 | 7/2020 | Jeon et al. |
| 2020/0389658 | A1 | 12/2020 | Kim et al. |
| 2021/0044813 | A1* | 2/2021 | Park ..................... H04N 19/30 |
| 2021/0127119 | A1 | 4/2021 | Li et al. |

FOREIGN PATENT DOCUMENTS

| | | | |
|---|---|---|---|
| KR | 10-2020-0009118 A | 1/2020 | |
| KR | 10-2474168 B1 | 12/2022 | |
| WO | 2018/121798 A1 | 7/2018 | |
| WO | WO-2020080751 A1 * | 4/2020 | .............. G06N 3/08 |

OTHER PUBLICATIONS

International Search Report (PCT/ISA/210) dated Sep. 21, 2022 issued by the Int. Searching Authority in App No. PCT/KR2022/007288.

International Written Opinion (PCT/ISA/237) dated Sep. 21, 2022 issued by the Int. Searching Authority in App No. PCT/KR2022/007288.

Examination Report, dated Dec. 13, 2022, issued by Intellectual Property India, Application No. 202141023707.

Communication issued on Apr. 25, 2024 by the Intellectual Property India for Indian Patent Application No. 202141023707.

* cited by examiner

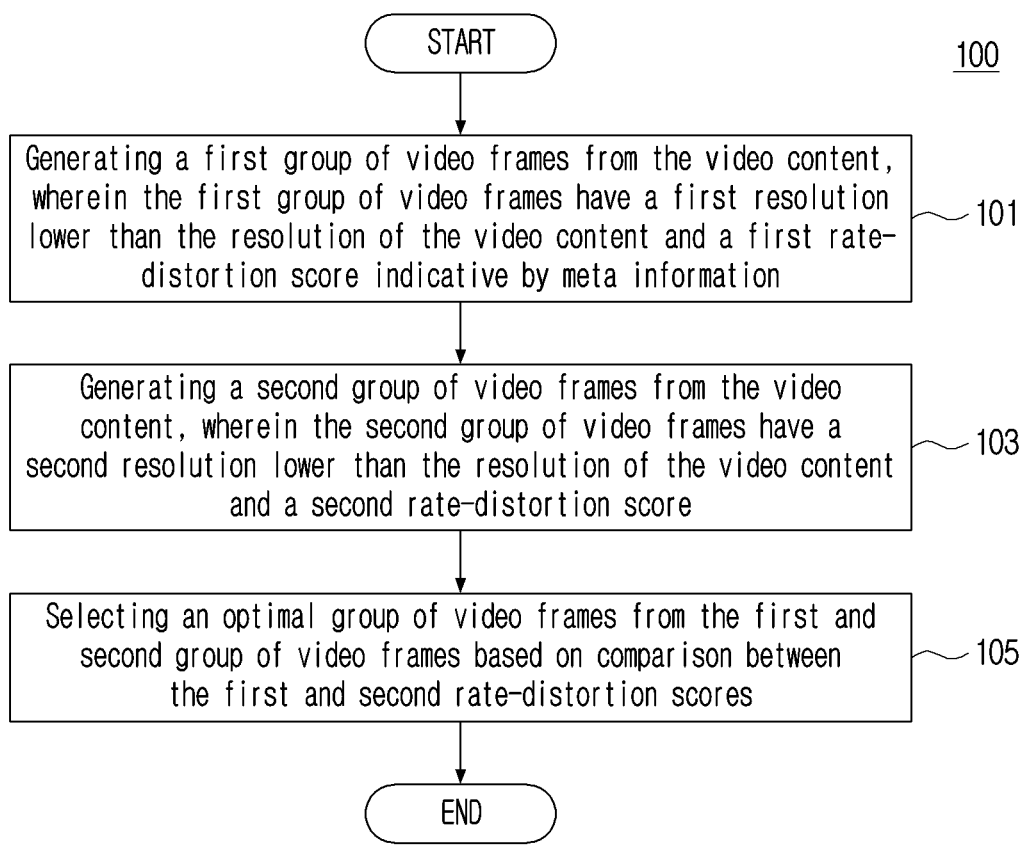

METHODS AND APPARATUS FOR PROCESSING OF HIGH-RESOLUTION VIDEO CONTENT

CROSS-REFERENCE TO RELATED APPLICATIONS

This application is a bypass continuation of International Application No. PCT/KR2022/007288, filed on May 23, 2022, which is based on and claims priority to Indian Patent Application No. 202141023707, filed on May 27, 2021, and Indian Patent Application No. 202141023707, filed on Feb. 3, 2022, in the Indian Intellectual Property Office, the disclosures of which are incorporated herein in their entireties by reference.

BACKGROUND

1. Field

The present disclosure generally relates to artificial intelligence (AI) based video compression. In particular, the present disclosure relates to methods and apparatuses for processing of high-resolution video content.

2. Description of the Related Art

A video may be stored in digital form. In its uncompressed state, the digital video may exist as a series of images, or video frames. High-definition digital video in its uncompressed state usually comprises a large amount of data that may need to immediately be either consumed or compressed for transmission or storage, for later decompression and consumption. In related systems, the video compression may be performed with the help of a video encoder that may compress the video to a fraction of its original size. At playback time, with the help of a digital processing apparatus, a corresponding video decoder may decompress and reconstruct the video for display. The success of this process may depend on the amount and kind of data lost in the compression process, the size, resolution, and frame rate of the display; the available computer resources; and the efficiency of the decoder.

As video resolutions continue to increase, there is a growing need to achieve ever higher compression rates to reduce the storage and streaming bandwidth requirements. However, it is a challenge to achieve higher compression rates while maintaining good quality.

Hence, there is a need in the art to provide techniques that provide higher compression and preserve video quality.

SUMMARY

The disclosure may provide a method and apparatus for pre-processing and/or post processing of video content.

This summary is provided to introduce a selection of concepts in a simplified format that are further described in the detailed description of the invention. This summary is not intended to identify key or essential inventive concepts of the invention, nor is it intended for determining the scope of the invention.

In an embodiment, the present subject matter refers to a method for pre-processing of video content. The method includes generating, by a processor, a first group of video frames from the video content. The first group of video frames has a first resolution lower than a resolution of the video content and a first rate-distortion score indicated by first meta information of the first group of video frames. The method further includes generating a second group of video frames from the video content. The second group of video frames has a second resolution lower than the resolution of the video content and a second rate-distortion score indicated by second meta information of the second group of video frame. The method further includes selecting an optimal group of video frames from the first group of video frames and the second group of video frames based on a comparison between the first rate-distortion score and the second rate-distortion score. A third rate-distortion score of the optimal group of video frames is lower than the first rate-distortion score and the second rate-distortion score.

In another embodiment, an apparatus for pre-processing of video content, is disclosed. The apparatus comprises a memory and a processor coupled to the memory. The processor is configured to generate a first group of video frames from the video content. The first group of video frames has a first resolution lower than a resolution of the video content and a first rate-distortion score indicated by first meta information of the first group of video frames. The processor is further configured to generate a second group of video frames from the video content. The second group of video frames has a second resolution lower than the resolution of the video content and a second rate-distortion score indicated by second meta information of the second group of video frame. The processor is further configured to select an optimal group of video frames from the first group of video frames and the second group of video frames based on a comparison between the first rate-distortion score and the second rate-distortion score. A third rate-distortion score of the optimal group of video frames is lower than the first rate-distortion score and the second rate-distortion score.

In another embodiment, a method for post processing of video content, is disclosed. The method includes decoding, by a processor, the video content using meta information associated with the video content. The method further includes reducing, by the processor, compression artifacts from the decoded video content, based on noise-cluster information associated with the video content. The method further includes upscaling, by the processor, the decoded video content, based on one or more of temporal information, level information, and scale information as associated with the decoded video content, to generate high resolution video content, using a plurality of convolutional neural networks (CNNs).

In yet another embodiment, an apparatus for post processing of video content, is disclosed. The apparatus comprises a memory and a processor coupled to the memory. The processor configured to decode the video content using meta information associated with the video content. The processor is further configured to reduce compression artifacts from the decoded video content, based on noise-cluster information associated with the video content. The processor is further configured to upscale the decoded video content, based on one or more of temporal information, level information, and scale information as associated with the decoded video content, to generate high resolution video content, using a plurality of CNNs.

To further clarify the advantages and features of the present disclosure, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 illustrates a method for pre-processing of video content, in accordance with an embodiment of the present disclosure;

Figure 2A:
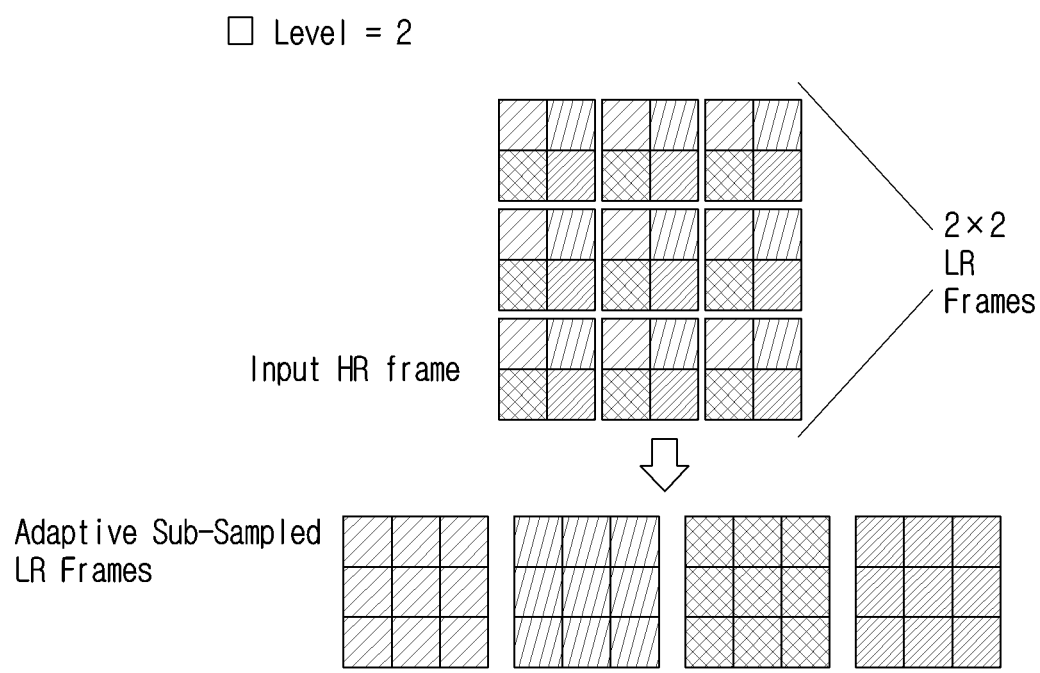
FIGS. 2A-2B illustrate a diagram for generation of sub-sampled low resolution (LR) video frames, in accordance with an embodiment of the present disclosure.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present invention. Furthermore, in terms of the construction of the system, one or more components of the system may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Embodiments of the present invention will be described below in detail with reference to the accompanying drawings.

FIG. 1 illustrates a flow diagram depicting a method for pre-processing of video content, in accordance with an embodiment of the present disclosure.

As shown in FIG. 1, at step 101, the method 100 includes generating a first group of video frames from the video content. In an embodiment, the video content may be a live content or a content stored in a user device. In an embodiment, the video content may be a high-resolution (HR) video content. The first group of video frames may have a first resolution which is lower than a resolution of the video content and a first rate-distortion score which is indicated by meta information. For example, if the resolution of the video content (e.g., original video content) is R1 and the resolution of the first group of video frames is R2, then R2 is less than R1 (e.g., R2<R1).

Figure 2B:
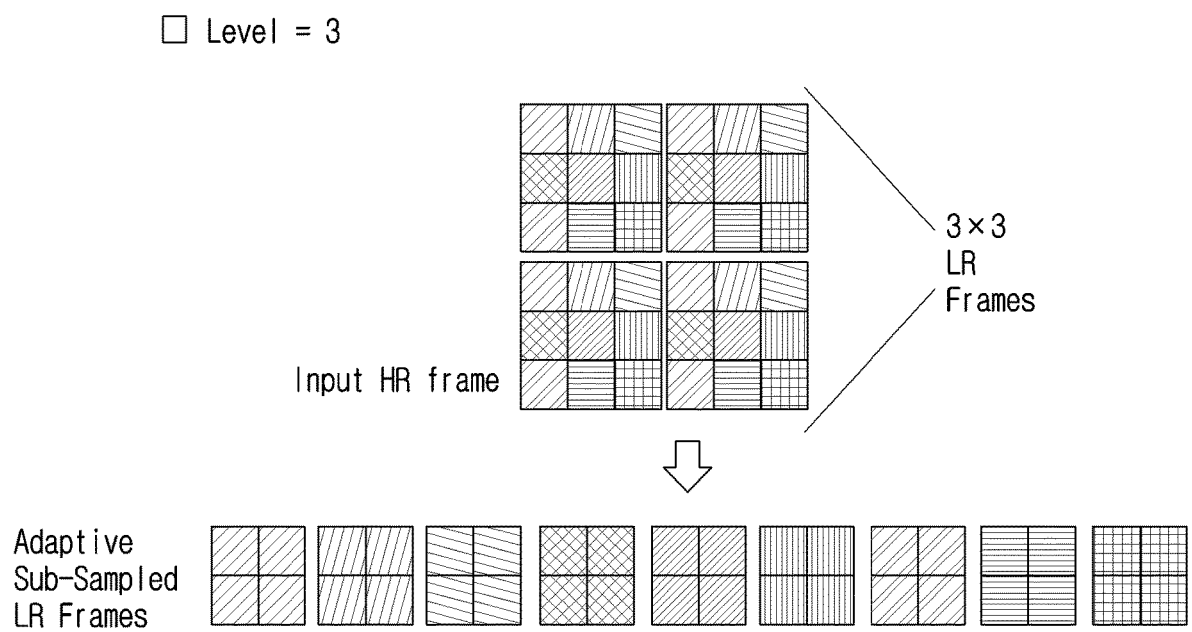

To generate the first group of video frames, the video content may be split into a plurality of groups of video frames. For example, the video content may be split into N groups of video frames, where N is an integer greater than 1. Then, a level for each of the plurality of groups of video frames (e.g., N groups of video frames) may be selected. The level may be selected by analyzing spatio-temporal properties of each of the plurality of groups of video frames. A group of adaptive sub-sampled low resolution (LR) video frames may be generated based on the selected level. In an embodiment, the level may refer to a level at which the LR videos frames are to be generated. For example, if the level is selected as 2, then 2×2 LR video frames may be generated from the input HR frame, as shown in FIG. 2A. Similarly, if the level is selected as 3, then 3×3 LR videos frames may be generated from the input HR frame, as shown in FIG. 2B. As such, each group of LR video frames may comprise of plurality of LR video frames.

Continuing to refer to step 101, each combination of LR frames may be analyzed corresponding to a HR frame for spatio-temporal redundancies. Based on the analysis, the redundant spatio-temporal split LR frames are excluded to generate the group of adaptive sub-sampled LR frames. Subsequently, a first group of video frames is generated with HR.

In an embodiment, the retained spatio-temporal LR frame combination in each group is upscaled to generate the first group of video frames. For example, the retained spatio-temporal LR frame combination may be upscaled using a plurality of convolutional neural networks (CNNs). The CNNs may be trained with single or multiple input frames to generate HR frames.

Thereafter, a first rate-distortion score associated with the first group of video frames is computed. In an embodiment, the first rate-distortion score may be computed based on assessing a loss of information within the first group of video frames with HR. That is, the first rate-distortion score may refer to pixel differences between the split group of video frames and the generated first group of video frames with HR.

Figure 3:
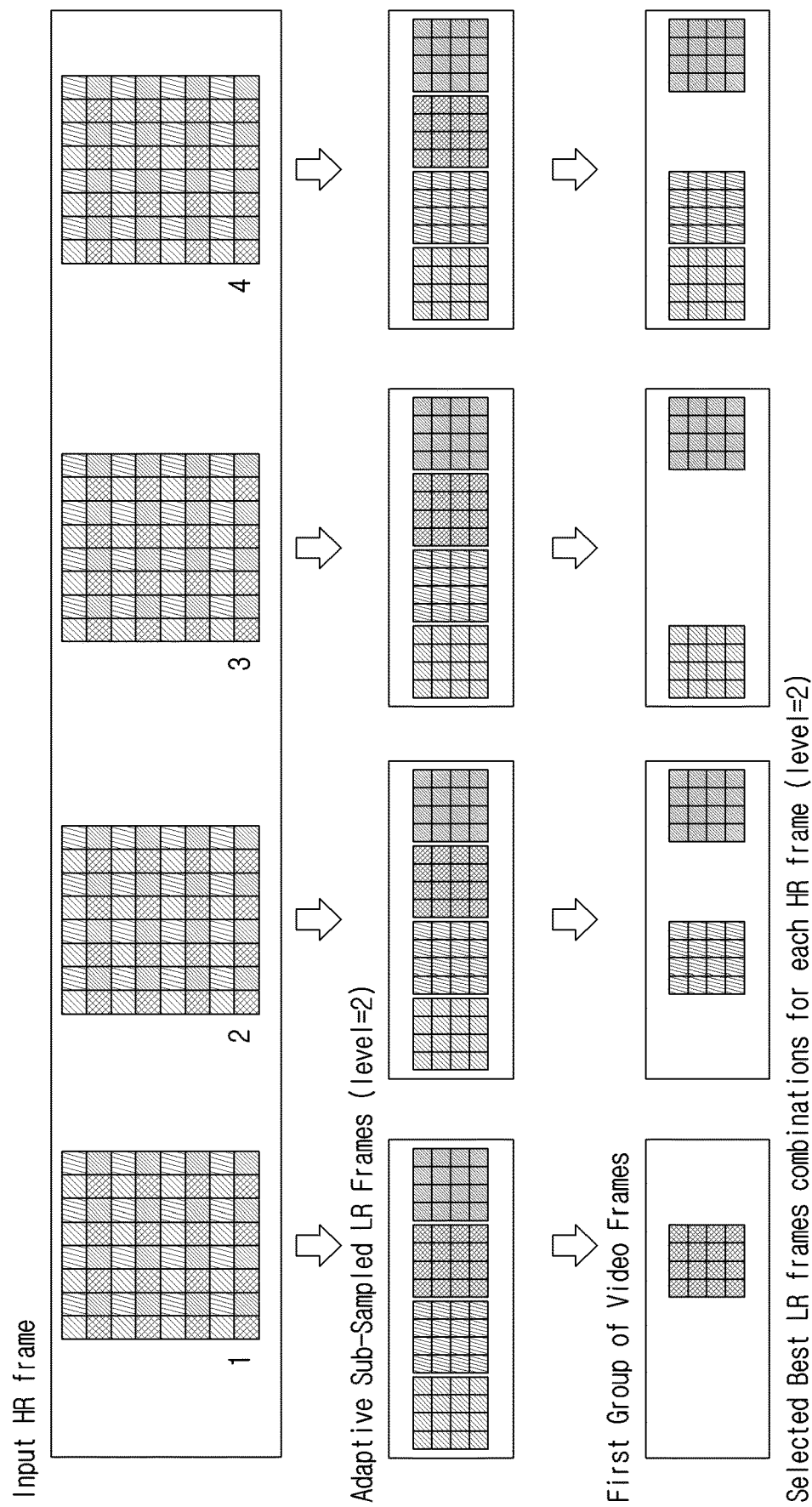
FIG. 3 illustrates generation of a first group of low resolution video frames for level 2, in accordance with an embodiment of the present disclosure.

In an embodiment, the first group of video frames may be selected based on the first rate-distortion score meeting a predetermined criteria. For example, the different groups of video frames may have different rate-distortion scores. In an embodiment, the group of video frames with the lowest rate-distortion score (e.g., lowest value) may be selected as the first group of video frames. That is, the predetermined criteria may instruct to select the group of video frames with the lowest rate-distortion rate as the first group of video frames, as shown in FIG. 3.

In an embodiment, the first meta information may be generated based on the first rate-distortion score. As such, the first meta information may indicate the first rate-distortion score of the first group of video frames.

Figure 4:
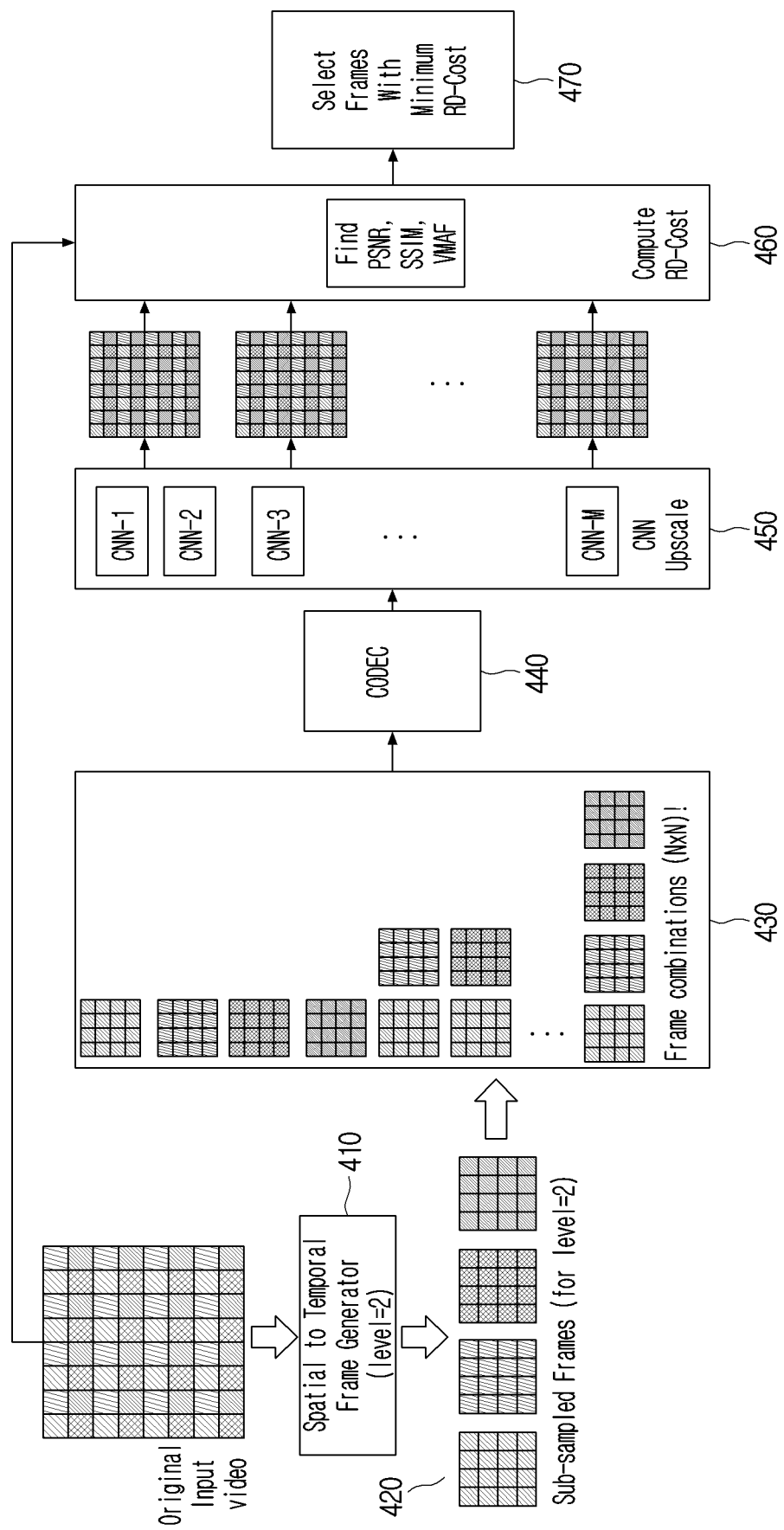
FIG. 4 illustrates generation of a first group of video frames, in accordance with an embodiment of the present disclosure.

FIG. 4 illustrates generation of a first group of video frames, in accordance with an embodiment of the present disclosure. As shown in FIG. 4, at 410, an input video frame is split into a plurality of N groups of video frames (e.g., sub-frames). At 420, the N groups of video frames are converted into a plurality of LR split video frames (e.g., adaptive sub-sampled LR frames). At 430, one or more combinations of each group of adaptive sub-sampled LR video frames may be generated. For example, the maximum number of combinations may be equal to the factorial of N times N (e.g., (N×N)!). At 440, the one or more combinations may be encoded for transmission, transmitted, received, and/or decoded (not shown). The decoded one or more combinations may be provided to a plurality of CNNs (e.g., CNN-1 through CNN-M). At 450, each of the frame combinations may be upscaled to generate a group of HR frames. At 460, a rate-distortion rate is computed for each group of HR frames. In an embodiment, the rate-distortion computation may include finding a peak signal-to-noise ratio (PSNR), a structural similarity index measure (SSIM), and/or a video multimethod assessment fusion (VMAF) metric for each group of HR frames. At 470, the HR frames with a lowest rate-distortion rate may be selected as a first group of video frames, according to the predetermined criteria.

In an embodiment, the generation of first group of video frames may be referred to as "Adaptive Spatio-Temporal Sub-sample Frame" generation.

Returning to FIG. 1, after generating a first group of video frames at step 101, the method 100 includes, at step 103, generating a second group of video frames from the video content. The second group of video frames may have a resolution lower than the video content and a second rate-distortion score.

Figure 5:
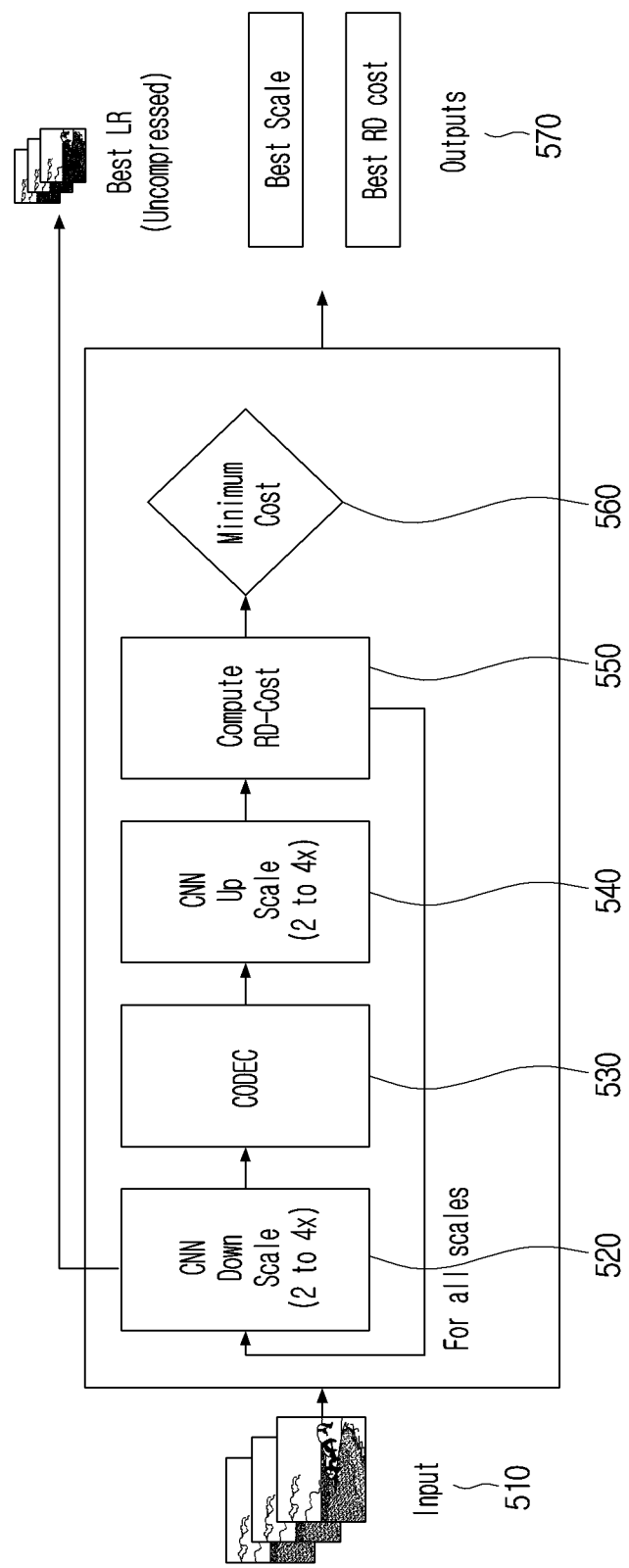
FIG. 5 illustrates generation of second group of video frames, in accordance with an embodiment of the present disclosure.

FIG. 5 illustrates generation of a second group of video frames, in accordance with an embodiment of the present disclosure. As shown in FIG. 5, at 510, to generate the second group of video frames, the video content may be split into a plurality of groups of video frames.

At 520, a scale factor may be selected to downscale each group of video frames. The video frames may be downscaled to avoid redundancies among the video frames. In an embodiment, the scale factor may be configurable and adaptive to characteristics of the video frames. For example, the scale factor may be high (e.g., 4 times factor or above) for homogeneous video frames and/or low (e.g., 2) for video frames with textured content. Alternatively or additionally, the scale factor may be selected to produce a target quality at a reduced bit stream size. Each group of video frames may be iteratively scaled by downscaling the group of video frames based on the scale factor. In an embodiment, the downscaling may be performed using a plurality of CNNs.

At 530, the downscaled group of video frames may be encoded for transmission, transmitted, received, and/or decoded (not shown). The decoded downscaled group of video frames may be provided to an upscaler.

At 540, a group of video frames from the plurality of groups of scaled video frames may be selected. In an embodiment, to select the group of video frames, the downscaled frames in each group may be upscaled using a plurality of CNNs. Thus, an upscaled second group of video frame with HR may be obtained. In an embodiment, each CNN may be executed independently for each group of video frames using several scale factors starting from 2× to 4× at 0.5 steps (e.g., 2×, 2.5×, etc.).

At 550, the second rate-distortion score associated with the second group of video frames may be computed. In an embodiment, the second rate-distortion rate may be computed based on assessing a loss of information within the upscaled second group of video frame. That is, the second rate-distortion score may refer to pixel differences between the split group of video frames and the upscaled second group of video frames.

At 560, the scale factor may be identified based on the second rate-distortion score meeting a predetermined criteria (e.g., minimum rate-distortion cost). In an embodiment, the predetermined criteria may be to identify the scale factor with the lowest second rate-distortion score. At 570, the second meta information may be generated based on the second rate-distortion score. For example, the second meta information may indicate the second rate-distortion score of the second group of video frames. In addition, the group of video frames associated with identified scaling factor may be selected.

In an embodiment, the selected group of video frames may be generated as the second group of video frames. In an embodiment, generation of second group of video frames may be referred to as "Adaptive Spatial Scaling".

Figure 6:
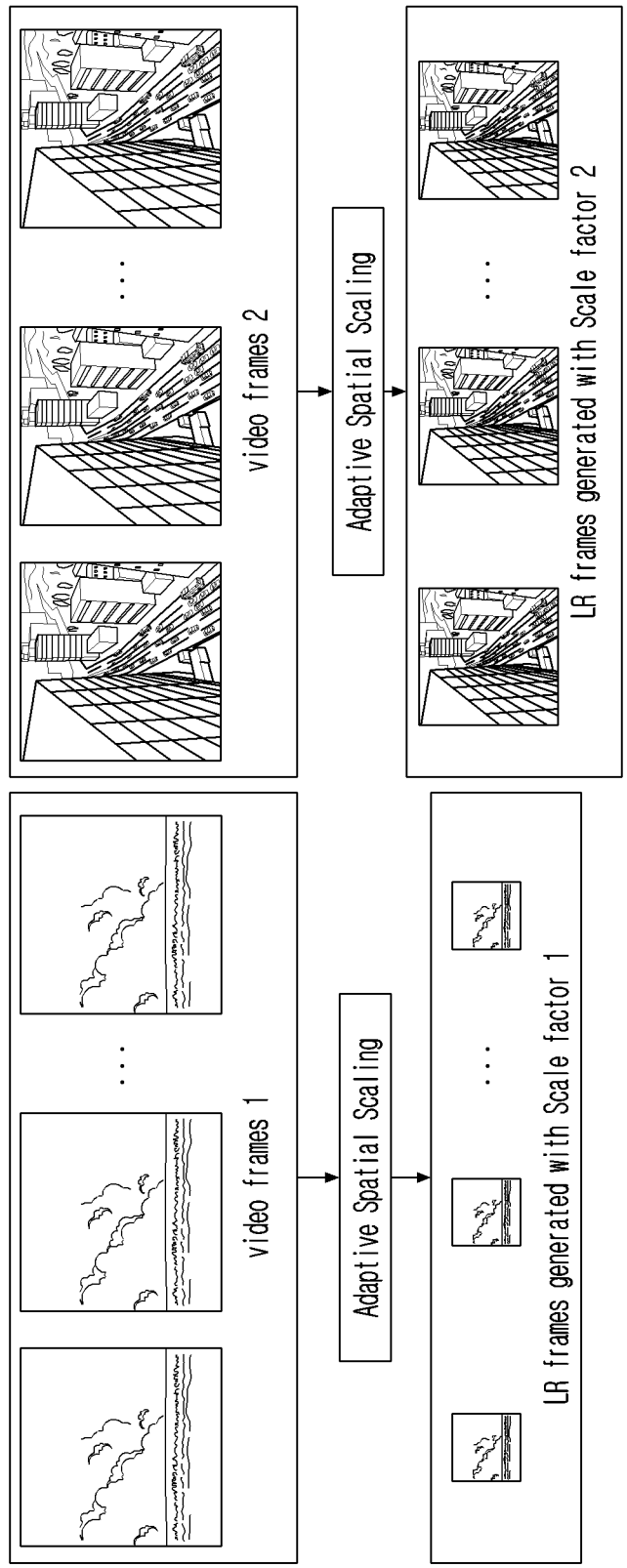
FIG. 6 illustrates an example of a second group of video frames, in accordance with an embodiment of the present disclosure.

FIG. 6 illustrates an example of a second group of video frames, in accordance with an embodiment of the present disclosure. As shown in FIG. 6, video frames 2 have more texture than video frames 1. Accordingly, the scale factor for video frames 1 may be greater than the scale factor for video frames 2.

In an embodiment, the first group of video frames and the second group of video frames may be generated in parallel and/or at a same time. In another embodiment, the first group of video frames and the second group of video frames may be generated in sequence, and/or with a time delay between the generation of one group of video frames and the generation of another group of video frames.

Returning to FIG. 1, after generating the second group of video frames at step 103, the method 100 includes at step 105, selecting an optimal group of video frames from the first group of video frames and the second group of video frames. In an embodiment, the first rate-distortion score and the second rate-distortion score may be compared and the video frame with a lowest rate-distortion score may be selected as the optimal group of video frames. That is, the optimal group of video frames may have a lower distortion rate than the first distortion rate and the second distortion rate. Alternatively or additionally, the optimal group of video frames may have a distortion rate between the first distortion rate and the second distortion rate.

In an optional or additional embodiment, the method 100 may further include clustering quantization noise associated with the optimal group of video frames to identify a noise-cluster information associated with the optimal group of video frames. In an embodiment, a clustering type for each frame of the optimal group of video frames may be classified and cluster information may be determined based on the classified clustering type. The cluster information may be used to select an appropriate artifact reduction at a decoder.

In an optional or additional embodiment, the method 100 may further include encoding the selected optimal group of video frames along with one or more of the first meta information, the second meta information, and the identified cluster information.

Figure 7:
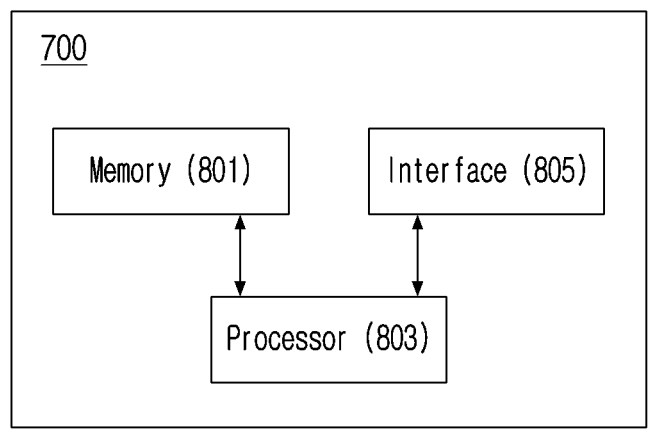
FIG. 7 illustrates a block diagram of an apparatus for pre-processing of video content, in accordance with an embodiment of the present disclosure.

FIG. 7 illustrates a block diagram of an apparatus 700 for pre-processing of video content, in accordance with an embodiment of the present disclosure. In an embodiment, the apparatus 700 may comprise a memory 701, a processor 703, and an interface 705. The processor 703 is coupled to the memory 701 and the interface 705. In an embodiment, the processor 703 may be configured to perform the method as discussed with respect to FIGS. 1-6. In an embodiment, the apparatus 700 may be a part of the user device. In another embodiment, the apparatus 700 may be connected to the user device. It should be noted that the term "user device" may refer to any electronic devices capable of storing, compressing and displaying a video, such as, but not limited to, a mobile device, a laptop, a personal digital assistant (PDA), and another similar device.

Figure 8:
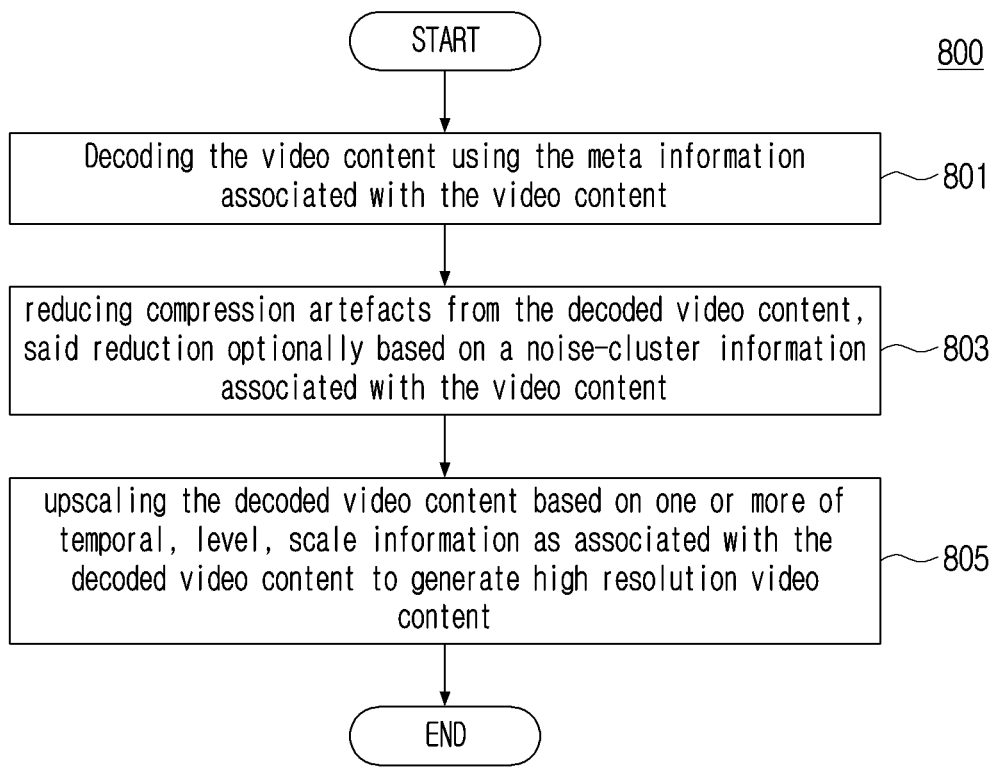
FIG. 8 illustrates a flow diagram depicting a method for post-processing of a video content, in accordance with an embodiment of the present disclosure.

FIG. 8 illustrates a flow diagram depicting a method 800 for post-processing of a video content, in accordance with an embodiment of the present disclosure. As shown in FIG. 8, the method 800, at step 801, includes decoding the video content using the meta information associated with the video content. At step 803, the method 800 includes reducing compression artifacts from the decoded video content, said reduction optionally based on a noise-cluster information associated with the video content. In an embodiment, the artifacts reduction may comprise applying CNNs to reduce the compression artifacts, if cluster information is available. Alternatively or additionally, if the cluster information is not available, on the fly clustering may be performed using a traditional low-complexity algorithm like k-means clustering.

After artifacts reduction, the method 800 includes at step 805, upscaling the decoded video content based on one or more of temporal information, level information, and scale information as associated with the decoded video content to generate high resolution video content. The adaptive upscaling may be based on a plurality of CNNs.

Figure 9:
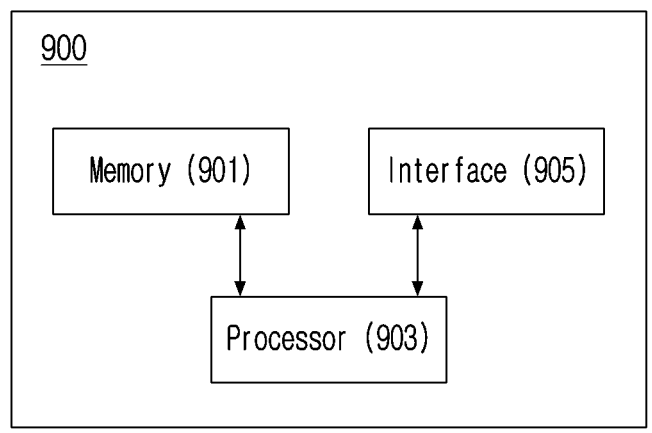
FIG. 9 illustrates a block diagram of an apparatus for post-processing of video content, in accordance with an embodiment of the present disclosure.

FIG. 9 illustrates a block diagram of an apparatus for post-processing of video content, in accordance with an embodiment of the present disclosure. In an embodiment, the apparatus 900 may comprise a memory 901, a processor 903, and an interface 905. The processor 903 is coupled to the memory 901 and the interface 905. In an embodiment, the processor 903 may be configured to perform the method as discussed in respect to FIG. 8. In an embodiment, the apparatus 900 may be a part of the user device. In another embodiment, the apparatus 900 may be connected to the user device. It should be noted that the term "user device" may refer to any electronic devices capable of storing, compressing and displaying a video, such as, but not limited to, a mobile device, a laptop, a PDA, and another similar device.

In an embodiment, the processors 703 and 903 may be a single processing unit or a number of units, all of which may include multiple computing units. The processors 703 and 903 may be implemented as one or more microprocessors, microcomputers, microcontrollers, digital signal processors, central processing units, state machines, logic circuitries, and/or any devices that manipulate signals based on operational instructions. Among other capabilities, the processors 703 and 903 may be configured to fetch and execute computer-readable instructions and/or data stored in the memory 701 and 901, respectively. The processors 703 and 903 may include one or a plurality of processors. The one processor and/or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors may control the processing of the input data in accordance with a predefined operating rule or artificial intelligence (AI) model stored in the non-volatile memory and the volatile memory 701, 901. The predefined operating rule or artificial intelligence model is provided through training or learning.

In an embodiment, the memory 701, 901 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 701, 901 includes a cache or random access memory for the processors 703 and 903. In alternative examples, the memory 701, 901 is separate from the processors 703 and 903, such as a cache memory of a processor, the system memory, or other memory. The memory 701, 901 may be an external storage device or database for storing data. The memory 701, 901 is operable to store instructions executable by the processors 703 and 903. The functions, acts or tasks illustrated in the figures or described may be performed by the programmed processors 703 and 903 for executing the instructions stored in the memory 701, 901. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

Figure 10:
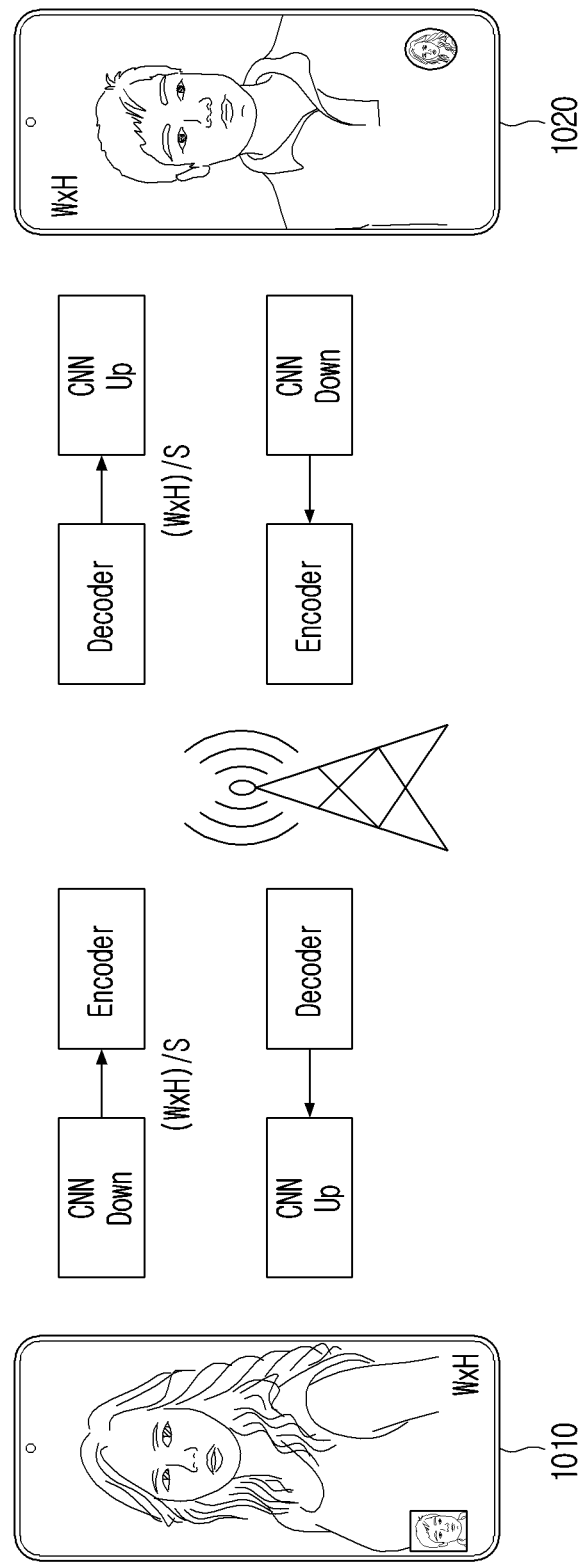
FIG. 10 illustrates an image depicting an artificial intelligence (AI) video call, in accordance with an embodiment of the present disclosure.

FIG. 10 illustrates an image depicting an AI video call, in accordance with an embodiment of the present disclosure. In FIG. 10, W may refer to a width of the input image/picture (ex: 1920 for FHD size), H may refer to a height of the input image/picture (ex: 1080 for FHD size), and S may refer to a scaling factor (Ex: 2 means downscaling by 2). For example, a device 1010 may downscale, using CNNs as described above in reference to FIGS. 1-7, video content of the AI video call to be transmitted to device 1020. The downscaled video content may be encoded for transmission and transmitted to the device 1020. The device may receive the encoded downscaled encoded transmission and decode and upscale the video content, using CNNs as described above in reference to FIGS. 8-9. Alternatively or additionally, the device 1020 may transmit video content of the AI video call to the device 1010 in a similar manner. In an embodiment, the present disclosure may enable high resolution video calls at reduced bandwidth (e.g., approximately 3× reduction).

Figure 11:
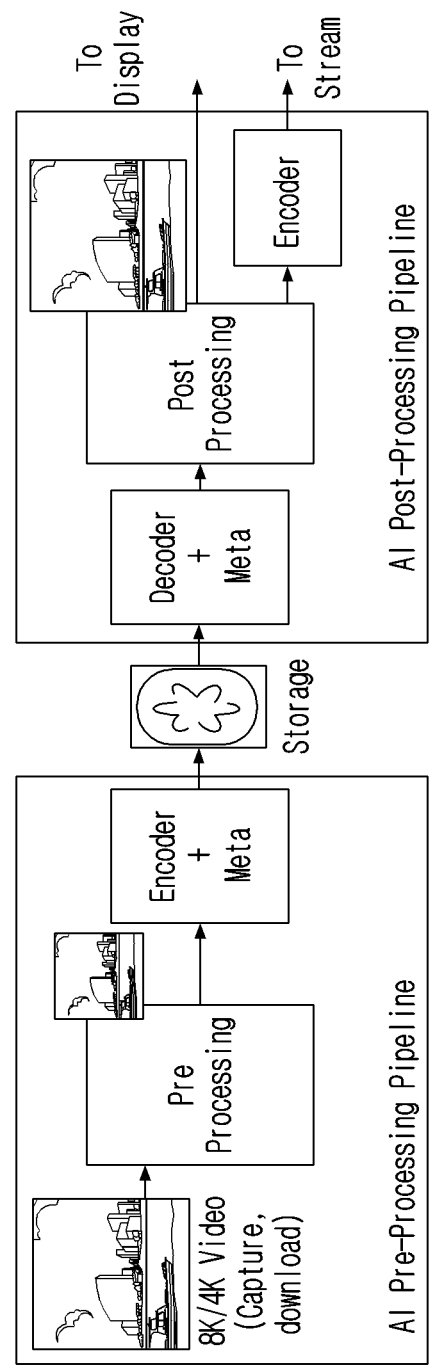
FIG. 11 illustrates an image depicting an AI video storage, in accordance with an embodiment of the present disclosure.

FIG. 11 illustrates an image depicting an AI video storage, in accordance with an embodiment of the present disclosure. In an embodiment, the present disclosure enables storing high resolution (e.g., 4K, 8K) videos in reduced space (e.g., approximately 2×-4× reduction). The pre-processing stage may adaptively reduce the resolution used to encode the high-resolution video into a reduced file size along with meta information. The post-processing stage may recover the high-resolution video while preserving video quality for content consumption (e.g., streaming, display). In an embodiment, the disclosed technique may process the videos offline when the device (e.g., apparatus 700, apparatus 900, device 1010, device 1020) is in an idle state.

Figure 12:
FIG. 12 illustrates exemplary images depicting a comparison between video call using related technology and implementation of the present method and apparatus, in accordance with an embodiment of the present disclosure.

FIG. 12 illustrates exemplary images depicting a comparison between a video call using related technology and implementation of the present AI-based method and apparatus, in accordance with an embodiment of the present disclosure. As shown in FIG. 12, the video call while implementing the disclosed techniques has an improved video quality.

Hence, the disclosed techniques analyze the video data and adaptive scales the data to improve compression efficiency. Further, the disclosed techniques enhance quality of video content by clustering the quantization noise and training different CNNs for each cluster. Further, the disclosed techniques provide a compression aware training scheme, where the pre- and post-processing CNNs are jointly trained in end-to-end pipeline by modelling the compression with a CNN.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for pre-processing of video content, comprising:
    generating, by a processor, a plurality of first groups of video frames from the video content, wherein the plurality of first groups of video frames has a first resolution lower than a resolution of the video content and a first rate-distortion score indicated by first meta information of the plurality of first groups of video frames;
    generating, by the processor, a plurality of second groups of video frames from the video content, wherein the plurality of second groups of video frames has a second resolution lower than the resolution of the video content and a second rate-distortion score indicated by second meta information of the plurality of second groups of video frames; and
    selecting, by the processor, an optimal group of video frames from the plurality of first groups of video frames and the plurality of second groups of video frames based on a comparison between the first rate-distortion score and the second rate-distortion score, wherein a third rate-distortion score of the optimal group of video frames is lower than at least one of the first rate-distortion score or the second rate-distortion score.

2. The method of claim 1, further comprising:
    clustering quantization noise associated with the optimal group of video frames;
    identifying, based on the clustered quantization noise, noise-cluster information associated with the optimal group of video frames; and
    encoding the optimal group of video frames along with one or more of the first meta information, the second meta information, and the identified noise-cluster information.

3. The method of claim 1, wherein the generating of the plurality of first groups of video frames comprises:
    splitting the video content into a plurality of groups of video frames;
    analyzing spatio-temporal properties of each group of the plurality of groups of video frames;
    selecting, based on the analyzing, a level for each group of the plurality of groups of video frames;
    generating respective groups of adaptive sub-sampled low resolution (LR) video frames for each group of the plurality of groups of video frames, based on the selected level for each group of the plurality of groups of video frames; and upscaling a spatio-temporal LR frame combination in each group of adaptive sub-sampled LR video frames, using a plurality of convolutional neural networks (CNNs), to generate the plurality of first groups of video frames with high resolution (HR).

4. The method of claim 3, further comprising:
computing the first rate-distortion score of the plurality of first groups of video frames based on assessing a loss of information within the plurality of first groups of video frames with HR; and
selecting the plurality of first groups of video frames based on the first rate-distortion score meeting a predetermined criteria.

5. The method of claim 3, wherein the generating of the respective groups of adaptive sub-sampled LR video frames comprises:
analyzing each combination of LR frames corresponding to an HR frame for spatio-temporal redundancies; and
excluding redundant spatio-temporal split LR frames to generate the respective groups of adaptive sub-sampled LR frames.

6. The method of claim 1, wherein the generating of the plurality of second groups of video frames comprises:
splitting the video content into a plurality of groups of video frames;
selecting a scale factor to downscale each group of the plurality of groups of video frames to avoid redundancies among video frames of that group;
iteratively downscaling each group of the plurality of groups of video frames using the scale factor; and
selecting a group of video frames as the plurality of second groups of video frames from the plurality of groups of scaled video frames based on the downscaling.

7. The method of claim 6, wherein the selecting of the group of video frames comprises:
upscaling the downscaled frames in each group using a plurality of convolutional neural networks (CNNs) to achieve an upscaled plurality of second groups of video frames with high resolution (HR);
computing the second rate-distortion score of the plurality of second groups of video frames based on assessing a loss of information within the upscaled plurality of second groups of video frames;
identifying the scale factor based on the second rate-distortion score meeting a predetermined criteria; and
selecting the group of video frames associated with the identified scale factor.

8. The method of claim 2, wherein the clustering of the quantization noise comprises:
classifying a clustering type for each frame of the optimal group of video frames; and
determining cluster information based on the classified clustering type, wherein the cluster information is used to select an appropriate artifact reduction at a decoder.

9. An apparatus for pre-processing of video content, the apparatus comprising:
a memory; and
a processor coupled to the memory and configured to:
generate a plurality of first groups of video frames from the video content, wherein the plurality of first groups of video frames has a first resolution lower than a resolution of the video content and a first rate-distortion score indicated by first meta information of the plurality of first groups of video frames;
generate a plurality of second groups of video frames from the video content, wherein the plurality of second groups of video frames has a second resolution lower than the resolution of the video content and a second rate-distortion score indicated by second meta information of the plurality of second groups of video frames; and
select an optimal group of video frames from the plurality of first groups of video frames and the plurality of second groups of video frames based on a comparison between the first rate-distortion score and the second rate-distortion score, wherein a third rate-distortion score of the optimal group of video frames is lower than at least one of the first rate-distortion score and the or the second rate-distortion score.

10. The apparatus of in claim 9, wherein the processor is further configured to:
cluster quantization noise associated with the optimal group of video frames;
identify, based on the clustered quantization noise, noise-cluster information associated with the optimal group of video frames; and
encode the optimal group of video frames along with one or more of the first meta information, the second meta information, and the identified noise-cluster information.

11. The apparatus of claim 9, wherein the processor is configured to generate the plurality of first groups of video frames by:
splitting the video content into a plurality of groups of video frames;
analyzing spatio-temporal properties of each group of the plurality of groups of video frames;
selecting, based on the analyzing, a level for each group of the plurality of groups of video frames;
generating respective groups of adaptive sub-sampled low resolution (LR) video frames for each group of the plurality of groups of video frames, based on the selected level for each group of the plurality of groups of video frames; and
upscaling a spatio-temporal LR frame combination in each group of adaptive sub-sampled LR video frames, using a plurality of convolutional neural networks (CNNs) to generate the plurality of first groups of video frames with high resolution (HR).

12. The apparatus of claim 11, wherein the processor is further configured to:
compute the first rate-distortion score of the plurality of first groups of video frames based on assessing a loss of information within the plurality of first groups of video frames with HR; and
select the plurality of first groups of video frames based on the first rate-distortion score meeting a predetermined criteria.

13. The apparatus of claim 11, wherein the processor is configured to generate the respective groups of adaptive sub-sampled LR video frames by:
analyzing each combination of split LR frames corresponding to an HR frame for spatio-temporal redundancies; and
excluding redundant spatio-temporal split low resolution (LR) frames to generate the respective groups of adaptive sub-sampled LR frames.

14. The apparatus of claim 9, wherein the processor is configured to generate the plurality of second groups of video frames by:
- splitting the video content into a plurality of groups of video frames;
- selecting a scale factor to downscale each group of the plurality of groups of video frames to avoid redundancies among video frames of that group;
- iteratively downscaling each group of the plurality of groups of video frames using the scale factor; and
- selecting a group of video frames as the plurality of second groups of video frames from the plurality of groups of scaled video frames based on the downscaling.

15. The apparatus of claim 14, wherein the processor is configured to select the group of video frames by:
- upscaling the downscaled frames in each group using a plurality of convolutional neural networks (CNNs) to achieve an upscaled plurality of second groups of video frames with high resolution (HR);
- computing the second rate-distortion score of the plurality of second groups of video frames based on assessing a loss of information within the upscaled plurality of second groups of video frames;
- identifying the scale factor based on the second rate-distortion score meeting a predetermined criteria; and
- selecting the group of video frames associated with the identified scale factor.

16. The apparatus of claim 10, wherein the processor is configured to cluster the quantization noise by:
- classifying a clustering type for each frame of the optimal group of video frames; and
- determining cluster information based on the classified clustering type, wherein the cluster information is used to select an appropriate artifact reduction at a decoder.

* * * * *